Feb. 6, 1962 T. A. ZOMPA 3,020,188
METHOD OF MAKING A FOLDABLE TRAVEL MIRROR CONSTRUCTION
Filed Oct. 27, 1958 2 Sheets-Sheet 1
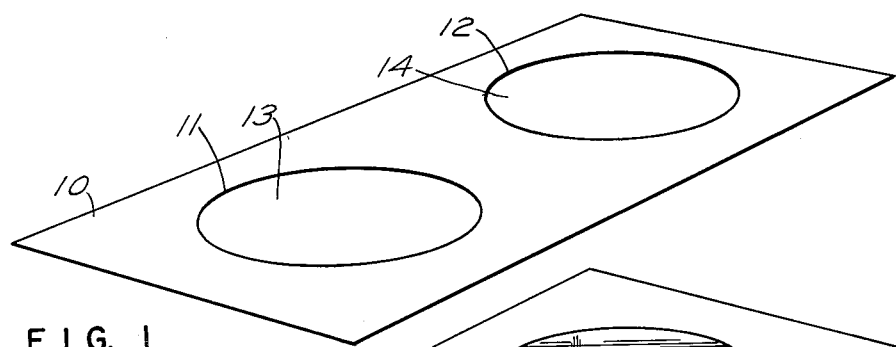
FIG. 1
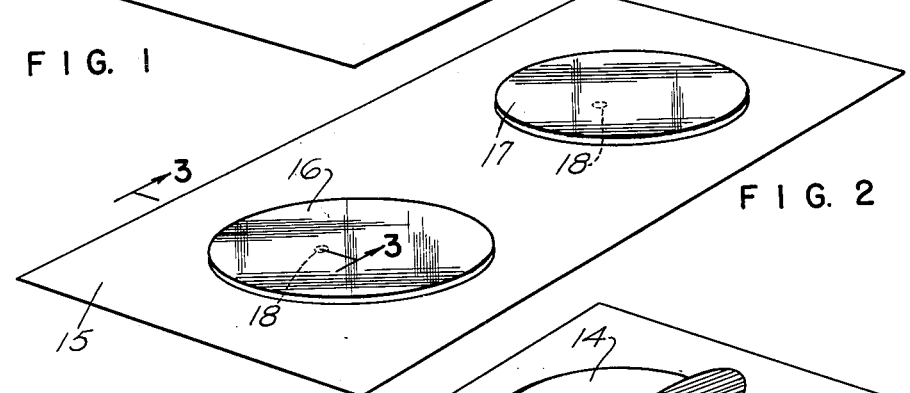
FIG. 2
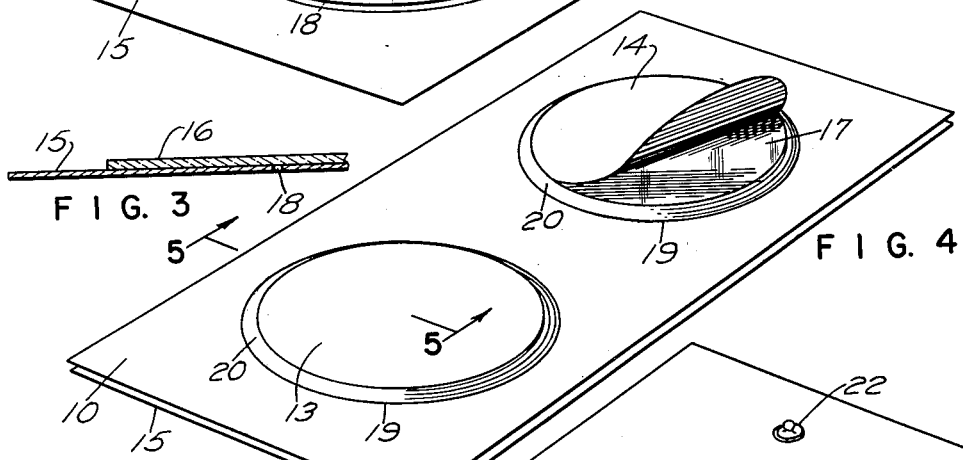
FIG. 3
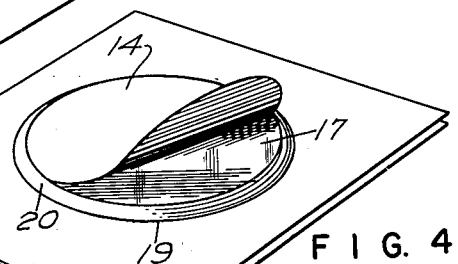
FIG. 4
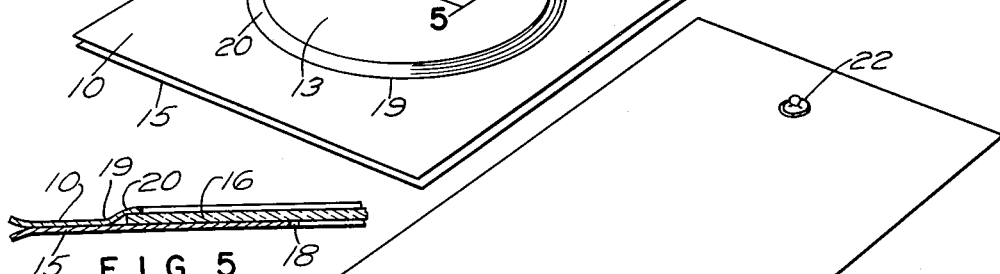
FIG. 5
FIG. 6
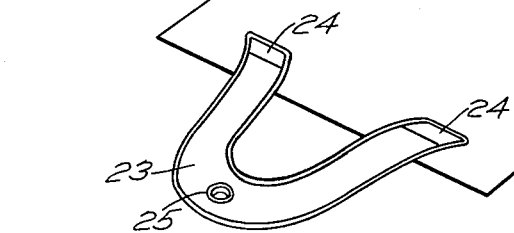
INVENTOR.
THOMAS A. ZOMPA
BY *Max Schwartz*
ATTORNEY

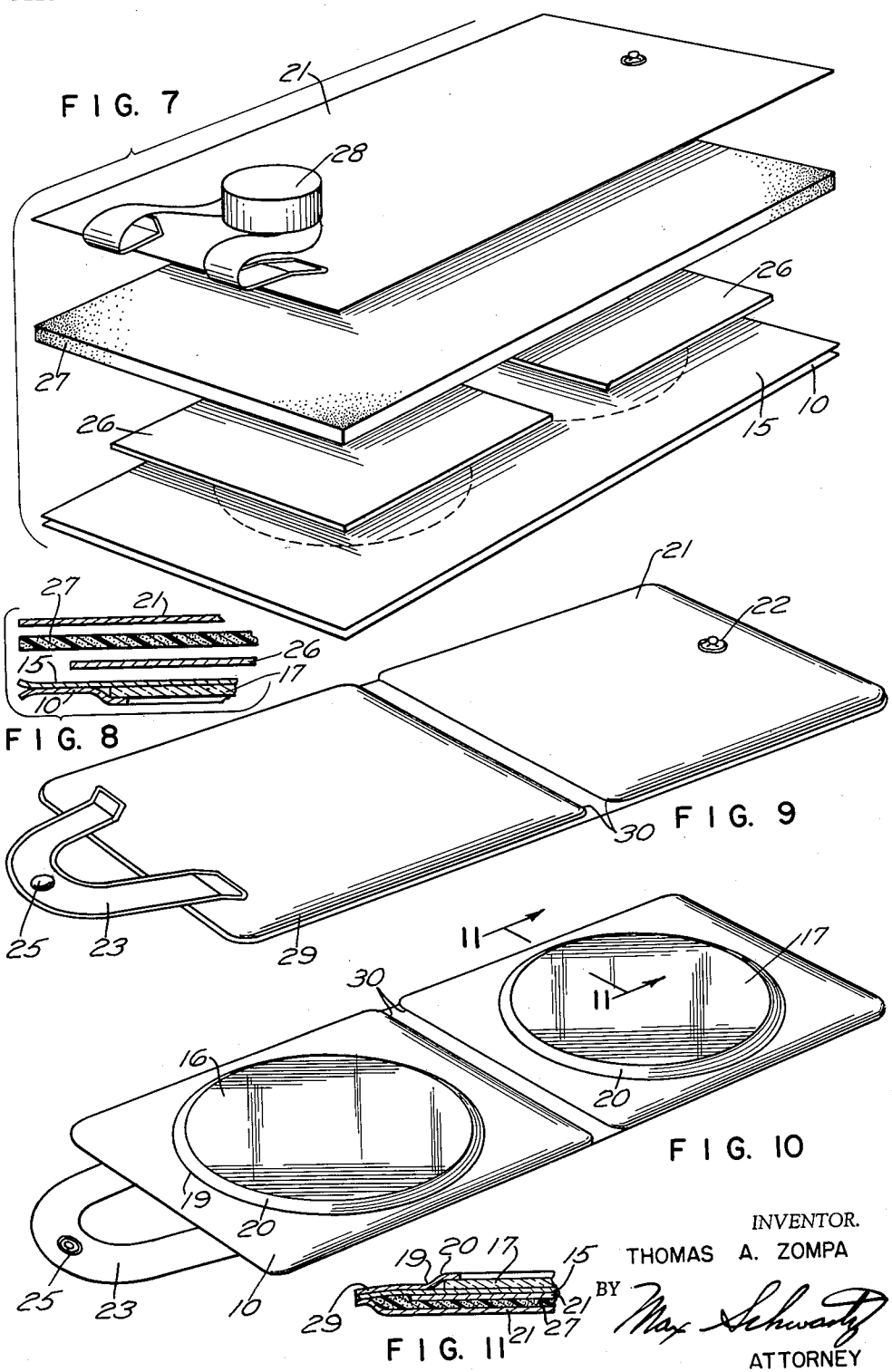

3,020,188
METHOD OF MAKING A FOLDABLE TRAVEL MIRROR CONSTRUCTION
Thomas A. Zompa, East Providence, R.I., assignor to Trina, Inc., Providence, R.I., a corporation of Rhode Island
Filed Oct. 27, 1958, Ser. No. 769,900
3 Claims. (Cl. 156—221)

My present invention relates to a novel construction of a travel mirror and a novel method of manufacturing the same.

The principal object of the present invention is to provide a novel travel mirror which can be readily folded for packing.

Another object of the present invention is to provide a travel mirror having a protective covering to prevent accidental breakage.

A further object of the present invention is to provide a novel method of manufacture for the travel mirror.

With the above and other objects and advantageous features in view, my invention consists of a novel arrangement of parts and a novel method of manufacture more fully disclosed in the detailed description following, in conjunction with the accompanying drawings, and more particularly defined in the appended claims.

In the drawings,

FIG. 1 is a perspective view of the inside cover portion of the travel mirror.

FIG. 2 is a perspective view of the mirror holding base.

FIG. 3 is a section taken on line 3—3 on FIG. 2.

FIG. 4 is a perspective view of the inside cover and the mirror holding base in assembled position.

FIG. 5 is a section taken on line 5—5 on FIG. 4.

FIG. 6 is a perspective view of the outside cover.

FIG. 7 is an exploded view showing the various elements of the mirror before assembly.

FIG. 8 is a section similar to FIG. 5 showing the various elements shown in FIG. 7.

FIG. 9 is a perspective view showing the outside of the assembled mirror in open position.

FIG. 10 is a perspective view showing the inside of the mirror in open position.

FIG. 11 is a section taken on line 11—11 on FIG. 10.

Mirrors made for travel purposes must be compact to take up a minimum of space and must be protected against damage. The present invention provides a novel mirror construction and a novel method of manufacture to produce a travel mirror which meets these requirements and is pleasing in appearance and easy to use. The mirror of the present invention is preferably mounted in a plastic case which permits the rapid and easy method of manufacture referred to herein.

The various figures show the steps in the manufacture of the mirror of the present invention. Referring to FIG. 1, a rectangular sheet of plastic material 10 is heavily scored at 11 and 12 to form circular evenly spaced separable discs 13 and 14. The plastic material 10 forms the inside cover of the finished product and must therefore have the desired final coloration and design if any.

Referring to FIG. 2, I provide an intermediate sheet of plastic material 15 of the same rectangular size as the sheet 10. In the second step of the process a pair of circular mirrors 16 and 17 are positioned on the sheet 15 and spot glued thereto to prevent shifting of the mirrors during the subsequent assembly operations. The mirror 16 may be a standard flat mirror, while the mirror 17 may be slightly concave to provide an enlarged image. In positioning the mirrors 16 and 17 it is preferable to use a jig so that the mirrors will be uniformly centered on each piece. To prevent the entrapment of air the sheet 15 is provided with an opening 18 behind each mirror but eccentric to it so as not to interfere with the glue at the center.

FIGS. 4 and 5 illustrate the next step in the assembly. The sheet 10 is positioned over the sheet 15 and heat and pressure are applied along annular lines 19 around the mirrors 16 and 17 to join the plastic sheets 10 and 15 to each other along these lines. It will be noted that the diameter of the removable discs 13 and 14 is less than the diameter of the mirrors 16 and 17 so that an overhanging rim or lip of material 20 extends over the edge of each mirror after the removal of the separable discs 13 and 14. Since the sheets 10 and 15 are now joined along the lines 19 around each mirror, the mirrors 16 and 17 are firmly and permanently held in position with a triple safeguard. The initial spot gluing holds the mirrors in place, the mirrors are also confined by the joinder lines 19, and the mirrors are also retained in position by the overhanging lips 20. The overhanging lips 20 also serve the purpose of covering the raw edge of the mirror and also form a buffer thickness which prevents the mirrors from rubbing against each other in folded position.

In the next step I prepare the outside cover shown in FIG. 6. This comprises a sheet of plastic material 21 of the same rectangular size as the sheets 10 and 15. The sheet 21 is in the desired finished color and may have suitable designs thereon. Adjacent one end the sheet 21 is provided with a male snap button 22. Adjacent the other end, but spaced therefrom, a U-shaped handle portion 23 is mounted with its free ends attached to the surface of the sheet at points 24 by heat and pressure to join the plastic materials. At the U-bend the handle portion 23 is provided with a complementary female snap portion 25.

The prepared materials are now positioned in a suitable die as shown in FIGS. 7 and 8. The assembly shown in FIGS. 4 and 5 is positioned on the bottom upside down so that the sheet 15 is at the top and the sheet 10 and the exposed mirrors are beneath. A square cardboard backing 26 is placed on the sheet 15 behind each mirror. Over the cardboard squares 26 is positioned a rectangular sheet of foam plastic material 27 of the same size as the sheets 10 and 15. The outside sheet 21 is positioned at the top. The handle portion 23 is folded back on to the top sheet 21 so that it exposes the edge of the sheet and a weight 28 is placed on the handle to hold it temporarily in this position.

The parts are now assembled in the die by the application of heat and pressure around the periphery 29 and along two transverse center lines 30 to squeeze the edges together as shown in FIGS. 9, 10 and 11. The excess material beyond the scoring 29 is peeled off to provide a smooth edge. The lines 30 are not scored as heavily and merely provide a thinner central transverse portion which permits ready bending.

The above steps complete the assembly of the finished mirror shown in FIGS. 9, 10 and 11. In traveling the portion holding the mirror 17 is folded over on to the portion holding the mirror 16 and the handle 23 is bent over the two edges so that the snap portion 25 can be snapped on to the portion 22 to lock the device in folded position. With the mirrors folded inside, the foam plastic sheet 27 and cardboard squares 26 will protect the mirrors from breakage. In use, the assembly can be suspended on a hook from the handle 23 or partially folded back and stood on edge. The finished article forms a convenient travel mirror which can be folded into a small compact area for carrying and in which the glass portions are well protected against breakage and cannot

I claim:

1. The method of making a travel mirror comprising the steps of scoring spaced openings in a rectangular sheet of plastic material, gluing spaced mirrors to a second sheet of plastic material, said mirrors being of larger diameter than said openings, placing said first sheet of plastic material over said second sheet of plastic material with said openings concentric with said mirrors, applying heat and pressure to join said sheets around the periphery of each mirror, placing an outside sheet of plastic material in back of said sheets, and joining all the sheets adjacent the edges by heat and pressure and simultaneously flattening a transverse line across said sheets to provide a foldable portion.

2. The method of making a travel mirror comprising the steps of scoring spaced openings in a rectangular sheet of plastic material, gluing spaced mirrors to a second sheet of plastic material, said mirrors being of larger diameter than said openings, placing said first sheet of plastic material over said second sheet of plastic material with said openings concentric with said mirrors, applying heat and pressure to join said sheets, placing cardboard stiffening members in back of each mirror, placing a sheet of foam plastic material in back of said second sheet, placing an outside sheet of plastic material in back of said sheets, and joining all the sheets adjacent the edges by heat and pressure and simultaneously flattening a transverse line across said sheets to provide a foldable portion.

3. The method of making a travel mirror comprising the steps of scoring spaced openings in a rectangular sheet of plastic material, gluing spaced mirrors to a second sheet of plastic material, said mirrors being of larger diameter than said openings, placing said first sheet of plastic material over said second sheet of plastic material with said openings concentric with said mirrors, applying heat and pressure to join said sheets around the periphery of each mirror, placing cardboard stiffening members in back of each mirror, placing a sheet of foam plastic material in back of said second sheet, placing an outside sheet of plastic material in back of said sheets, and joining all the sheets adjacent the edges by heat and pressure and simultaneously flattening a transverse line across said sheets to provide a foldable portion.

References Cited in the file of this patent

UNITED STATES PATENTS

| | | |
|---|---|---|
| 1,327,865 | Flaxbaum | Jan. 13, 1920 |
| 1,454,678 | Krueger | May 8, 1923 |
| 1,559,859 | Fischer | Nov. 3, 1925 |
| 2,164,655 | Kleerup | July 4, 1939 |
| 2,281,027 | Dennison | Apr. 28, 1942 |
| 2,389,788 | Lathrop | Nov. 27, 1943 |
| 2,431,238 | Friedman | Nov. 18, 1947 |
| 2,444,533 | Richardson | July 6, 1948 |
| 2,500,897 | Friedman | Mar. 14, 1950 |